UNITED STATES PATENT OFFICE 2,260,753

PROCESS FOR THE PRODUCTION OF DERIVATIVES OF EPIHALOHYDRINS

Kenneth E. Marple, Edward C. Shokal, and Theodore W. Evans, Oakland, Calif., assignors to Shell Development Company, San Francisco, Calif., a corporation of Delaware No Drawing. Application October 23, 1939, Serial No. 300,818

9 Claims. (Cl. 260—612)

This invention relates to a process for the production of a class of derivatives of the epihalohydrins. More particularly, the invention is concerned with a process wherein addition products are formed by reaction of an epihalohydrin with an organic hydroxy compound, this reaction being effected catalytically by the presence of an acid-acting inorganic fluorine-containing compound.

An object of the present invention is to provide a process for the production of the derivatives of the epihalohydrins in which the reaction between an epihalohydrin and an organic hydroxy compound is readily effected. Another object of the invention is to provide a method of forming an addition product of an epihalohydrin with an organic hydroxy compound without affecting or reacting to an appreciable extent the labile halogen atom of the epihalohydrin. A further object of the invention is to furnish a simple and economical process for producing the addition products of epihalohydrins with organic hydroxy compounds which is suitable for the commercial scale production of these valuable substances. Other objects will be apparent from the description of the invention given hereinafter.

According to the invention, the reaction between an epihalohydrin and an organic hydroxy compound to yield the addition product, a halohydrin ether or halohydrin ester, is effected by the presence of an acid-acting inorganic fluorine-containing compound. It has been found that these fluorine compounds are very suitable as catalysts for the reaction which enables a high yield of the desired product to be obtained. The high yields are apparently realized because the fluorine compounds permit the organic hydroxy compound to combine with the epihalohydrin by opening the epoxy ring and satisfying the valences resulting from opening the ring without affecting to an appreciable extent the labile halogen atom of the epihalohydrin, this halogen atom appearing unchanged and unreacted in the product. The acid-acting fluorine compounds are highly active as catalysts so that only relatively small amounts are necessary to catalyze the reaction markedly. Furthermore, they are effective in catalyzing the reaction of an epihalohydrin with any organic hydroxy compound. These features make them attractive to employ as catalyst for the technical scale production of the epihalohydrin addition products.

The invention broadly contemplates the reaction of an epihalohydrin with any organic hydroxy compound to form, when the hydroxy compound is an alcohol, phenol or derivative thereof, a halohydrin ether or, when the hydroxy compound is a carboxylic acid, a halohydrin ester. The reaction involved may be illustrated by the following equations which also exemplify the character of the products produced. Thus the reaction which occurs between methyl alcohol and epichlorhydrin, for example, in the presence of an acid-acting inorganic fluorine-containing compound may be represented by the equations:

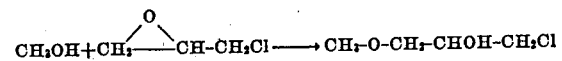

wherein the halohydrin ether produced is 1-chloro-2-hydroxy-3-methoxypropane. It is not necessary that the halogen atom in the epihalohydrin employed be linked to a carbon atom which in turn is attached directly to the epoxy group, since good results may also be obtained with epihalohydrins wherein the carbon atom to which the halogen is linked is one or more times removed from the epoxy group. This may be illustrated by the reaction of phenol with 1-bromo-3,4-epoxybutane according to the equation:

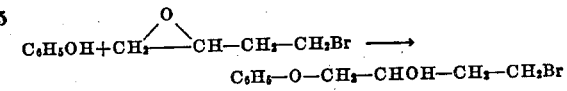

with another halohydrin ether (1-bromo-3-hydroxy-4-phenoxybutane) being produced. Furthermore, the invention is not limited to epihalohydrins containing 1,2-epoxide groups, but epihalohydrins containing 1,3-epoxide groups may be used as well. Also, besides hydroxy compounds wherein the hydroxy group is alcoholic or phenolic in character as indicated above, the hydroxy compound may be a carboxylic acid, such as may be illustrated by the reaction of acetic acid with 1-chloro-2,4-epoxybutane as shown by the equation:

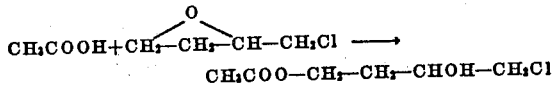

the product in this case being a halohydrin ester (1-chloro-2-hydroxy-4-acetoxybutane).

The fluorine compounds which are suitable for catalyzing and effecting the desired reaction are acid-acting and inorganic in character. Typical compounds which may be used include hydrofluoric acid (HF), acid fluoride salts such as potassium acid fluoride (KHF$_2$), boron trifluoride (BF$_3$), fluoboric acid (HBF$_4$), fluosilicic acid (H$_2$SiF$_6$), fluoplumbic acid (H$_2$PbF$_6$), and the like. The acid-acting inorganic fluorine-containing compounds are very active catalytically, and good results may be obtained when they are present in the reaction mixture in amounts ranging from a few hundredths of one percent to several percent. The preferred amount of catalyst to be used is dependent upon the particular fluorine-containing compound used, the reactivity of the reactants, the temperature employed, and the reaction rate desired. In general, with other factors equal, the greater the concentration of catalyst in the reaction mixture, the more rapid will be the reaction.

Of the fluorine-containing catalysts, hydrofluoric acid is a preferred member. It is readily available in commercial markets and is very active as a catalyst when present in the reaction mixture in only small amounts. These features make it very suitable for use in the technical scale operation of the process of the invention.

The fluorine-containing catalysts are unique and effective substances for effecting the desired addition reaction of an organic hydroxy compound with an epihalohydrin. Although the manner in which these compounds catalyze the reaction is not at present understood, they do appear to behave in the reaction mixture in an unusual way. For example, epihalohydrins are known to act somewhat like bases by combining with hydrochloric and hydrobromic acids to form dihalohydrins. Hydrofluoric acid, on the other hand, does not appear to combine with the epihalohydrins to an appreciable extent or if it does combine, it still retains the ability to catalyze the desired reaction. This action of the halogen compounds other than the fluorine compounds makes them unsuitable as catalysts, and they cannot be used to effect or accelerate the desired reaction.

As previously outlined, any organic hydroxy compound in which the hydroxy group is linked directly to a carbon atom may be employed in the process. Thus, the hydroxy group may be linked to a saturated carbon atom such as occurs in alcohols, to an aromatic carbon atom as in phenols, or to a carbonyl group as in carboxylic acids. The alcohols may be primary, secondary or tertiary in character, and may be either monohydric or polyhydric. They may also be either saturated or unsaturated and may contain one or more substituent groups or atoms, if desired. Representative compounds containing alcoholic groups which may be employed include monohydric alcohols, such as methyl ethyl, isopropyl, n-propyl, n-butyl, isobutyl, secondary butyl, tertiary butyl, cyclopentyl, methyl cyclohexyl, cyclopentenyl, allyl, methallyl, crotyl, propargyl, benzyl, cinamyl, furfuryl, etc.; polyhydric alcohols such as ethylene glycol, propylene glycol, isobutylene glycol, trimethylene glycol, glycerine, alpha methyl glycerine, beta methyl glycerine, alpha phenyl glycerine, erythritol, pentaerythritol, mannitol, sorbitol, etc.; substituted alcohols such as ethylene chlorhydrin, propylene bromhydrin, glycerine monochlorhydrin, glycerine dichlorhydrin, dichloro tertiary butyl alcohol, methyl ether of glycerol, isopropyl thioether of glycerol, butyl ether of ethylene glycol, phenyl ether of isobutylene glycol, ethylene glycol monoacetate, dipalmitin, ethyl lactate, dinitroglycerine, etc.; ketols, aldols and the like. Compounds containing a phenolic hydroxy group include phenol, the cresols, tertiary butyl phenol, resorcinol, catechol, orcinol, pyrogallol, phlorglucinol, naphthol, eugenol, creosol, chlorphenol, trinitrophenol and the like. Typical compounds wherein the hydroxy groups are linked to a carbonyl group include the carboxylic acids such as acetic, isobutyric, oleic, palmitic, acrylic, crotonic, benzoic, naphthenic, chloracetic, lactic, glutaric, maleic, phthalic, etc. Less preferred hydroxy compounds are those which contain in addition to the hydroxy group, such groups as amino groups, carbonyl groups and the like which are also reactive with the epihalohydrin in competition with the hydroxy group.

Representative epihalohydrins which may be used include epichlorhydrin, epibromhydrin, alpha methyl epichlorhydrin, beta methyl epiiodohydrin, cyclohexyl epichlorhydrin, phenyl epichlorhydrin, 1-bromo-3,4-epoxybutane, 1-chloro-2,4-epoxybutane, 1-chloro-2,5-epoxycyclopentane and the like.

The fluorine-containing catalysts of the invention, especially hydrofluoric acid, are particularly effective for catalyzing the reaction of epihalohydrins with organic hydroxy compounds containing a primary alcoholic group. The higher catalytic activity with primary alcohols makes possible a lower concentration of catalyst in the the reaction mixture for a given reaction rate or a shorter reaction time for a given concentration of catalyst with primary alcohols as compared to secondary and tertiary alcohols. This behavior of the catalyst makes the primary alcohols the most preferred reactants of the alcohols. In general, the reactivity of the organic hydroxy compounds falls in the following order: compounds containing the hydroxy group linked to the carbon atom of a carbonyl group, compounds containing a phenolic hydroxy group, compounds containing a primary alcoholic group, compounds containing a secondary alcoholic group, and compounds containing a tertiary alcoholic group.

The desired reaction between the epihalohydrin and the organic hydroxy compound is effected by heating a mixture of the reactants containing the fluorine catalyst. The preferred temperature at which the process is operated is the normal boiling temperature of the reaction mixture. Since the reaction occurs in the liquid phase, the materials vaporizing from the boiling mixture may be returned thereto by some suitable condensing means, such as a reflux condenser, for example. However, it may in some cases be desirable to conduct the reaction at temperatures above or below the normal boiling temperatures. The reactants and catalyst may be kept in the liquid phase by the use of superatmospheric pressures. The pressure utilized is at least equal to the total vapor pressure of the reaction mixture at the operating temperature.

The hydroxy compound is ordinarily employed in a molecular excess over the epihalohydrin in the reaction mixture. This expedient tends to favor the primary combination product between one mol of the hydroxy compound and one mol of the epihalohydrin, which product is the halohydrin ether or halohydrin ester usually desired, and secondary products resulting from reaction of the primary halohydrin ether or ester with additional epihalohydrin are suppressed. This reaction resulting in the formation of secondary products is not, however, a troublesome feature of the process, since ordinarily the reactivity of the initial hydroxy compound with the epihalohydrin is considerably greater than the primary halohydrin ether with additional epihalohydrin. Excellent yields of the primary product may be obtained with the molecular ratio of hydroxy compound to epihalohydrin of about 2–5 to 1.

When secondary products are desired rather than primary, lower ratios may be used or even a molecular excess of the epihalohydrin.

If desired, various diluents which are substantially inert may be employed in the process. Suitable substances for this purpose are aromatic and non-aromatic hydrocarbons, halogenated hydrocarbons, ethers, and the like. The diluents are often convenient solvents or carriers in which the catalyst may be introduced into the reaction mixture. Thus, for example, hydrofluoric acid which is a gas in the free state at ordinary conditions may be introduced into the reaction mixture conveniently in the form of a solution in a suitable diluent. It is not, however, essential that the catalyst be used in this manner, since good results may be obtained by adding the catalyst per se without using an extraneous diluent to the mixture of the reactants, or the catalyst may be incorporated with one of the reactants, preferably the hydroxy compound, to avoid polymerization which tends to occur with the epihalohydrin alone in the presence of the catalyst, and the second reactant added to the mixture of catalyst and other reactant.

The process of the invention may be executed in a variety of manners and is adaptable to batchwise, intermittent and continuous operation. For example, a suitable batchwise method is to prepare a mixture of the epihalohydrin and the organic hydroxy compound and add the desired amount of catalyst with or without a diluent. This reaction mixture may then be heated in a suitable reaction vessel fitted with condensing means when operation is at or near the boiling point of the reaction mixture, such as a reflux condenser. For higher temperatures, suitable pressure generating means may be employed. With reactants which may be immiscible with each other or the catalyst, it may be desirable to agitate the mixture during the reaction by some contrivance for this purpose. The course of the reaction may be followed by withdrawing samples from the reaction mixture and subjecting them to analysis. Upon completion of the reaction, the catalyst and whatever other acidity may have developed may be neutralized by treatment with basic-acting substances. The carbonates are suitable. The fluorine-containing part of the compound used as catalyst may be removed from the reaction mixture by treatment with a material which precipitates the catalyst as an insoluble compound. For example, hydrofluoric acid may be removed by adding a compound such as a magnesium, calcium, or thallium salt which will precipitate the fluoride as a substantially insoluble compound, and then neutralizing any acid with a basic-acting substance. The product may be separated from the reaction mixture by any suitable method, such as distillation, extraction, stratification and the like. Distillation is a preferred method, especially distillation under subatmospheric pressure. When excess hydroxy compound is used, the unreacted portion thereof may be recovered and reutilized in the process.

Another method of executing the process is to add the epihalohydrin in portions to the hydroxy compound containing the catalyst. The reaction mixture may be maintained at the desired temperature and by adding the epihalohydrin thereto about as fast as it reacts, the ratio of hydroxy compound to epihalohydrin may be kept high, which may be desirable in some cases.

Continuous operation may be accomplished by feeding the reactants and catalyst into a reaction vessel and withdrawing the reaction mixture at approximately the same rate as that of the feed input. The residence time in the reaction vessel should be adjusted so that substantially complete reaction is obtained. Any unreacted reactants in the withdrawn material may be separated therefrom and returned to the inlet of the reactor. Good agitation is helpful in such a system.

The acid-acting inorganic fluorine-containing compounds which are used as catalyst in the process of the invention make possible the opening of the epoxide ring of the epihalohydrin by the organic hydroxy compound with the formation of a halohydrin ether or halohydrin ester without the labile halogen atom of the epihalohydrin reacting or being affected to an appreciable extent. This is a very desirable feature of the process which makes the products very useful, since the resulting product then contains the labile halogen atom intact which may be utilized in reactions of the product in other processes along with the hydroxy group from the opening of the ring. For example, the halohydrin ethers which may be produced by the process contain both the halogen atom and a hydroxy group, and they may be dehydrohalogenated by treatment with basic-acting compounds to yield epoxide ethers which are very useful as solvents for numerous materials in industrial applications. Besides being used as chemical intermediates, the halohydrin ethers and esters may be employed as solvents, extractants, insecticides, fungicides and in a variety of miscellaneous applications.

The following examples are given for illustrative purposes only to indicate more clearly the process of the invention:

*Example I*

About 278 gm. (3 mols) of epichlorhydrin was mixed with 384 gm. (12 mols) of methyl alcohol and approximately 0.88 cc. (0.012 mols) of 47% hydrofluoric acid added as catalyst. The reaction was then heated and maintained at refluxing temperature for about 19 hours. At the end of this time, an analysis of a sample of the reaction mixture indicated the reaction was complete. About 1.5 gm. of sodium carbonate was added to neutralize the acid and 1.5 gm. of calcium chloride to precipitate the fluoride. The excess methyl alcohol was removed by distillation, and the yield of the methyl ether of glycerine monochlorhydrin obtained was in excess of 95%.

*Example II*

A mixture containing about 278 gm. (3 mols) of epichlorhydrin, 720 gm. (12 mols) of isopropyl alcohol and 2.2 cc. (0.03 mols) of 47% hydrofluoric acid was prepared and refluxed for approximately 24 hours. The reaction was then complete. The acid was neutralized with sodium carbonate, and the mixture distilled to recover the unreacted isopropyl alcohol. A yield in excess of 85% was obtained for the product, the isopropyl ether of glycerine monochlorhydrin.

We claim as our invention:

1. A process for the production of the methyl ether of glycerine monochlorhydrin which comprises reacting epichlorhydrin with methyl alcohol in the presence of hydrofluoric acid.

2. A process for the production of a halohydrin ether which comprises reacting an epihalohydrin with a primary alcohol in the presence of hydrofluoric acid.

3. A process for the production of a halohydrin ether which comprises reacting an epihalohydrin with a monohydric alcohol in the presence of hydrofluoric acid.

4. A process for the production of a halohydrin ether which comprises reacting an epihalohydrin with a phenol in the presence of hydrofluoric acid.

5. A process for the productiin of a halohydrin ether which comprises reacting an epihalohydrin with an alcohol in the presence of hydrofluoric acid.

6. A process for the production of an addition product of an epihalohydrin which comprises reacting the epihalohydrin with an organic hydroxy compound from the group consisting of the alcohols and phenols, said reaction being catalyzed by the presence of hydrofluoric acid.

7. A process for the production of a halohydrin ether which comprises reacting an epihalohydrin with a phenol in the presence of an acid-acting inorganic fluorine-containing compound.

8. A process for the production of a halohydrin ether which comprises reacting an epihalohydrin with an alcohol in the presence of an acid-acting inorganic fluorine-containing compound.

9. A process for the production of an addition product of an epihalohydrin with an organic hydroxy compound from the group consisting of the alcohols and phenols, said reaction being catalyzed by the presence of an acid-acting inorganic fluorine-containing compound.

KENNETH E. MARPLE.
EDWARD C. SHOKAL.
THEODORE W. EVANS.